(12) United States Patent
Jiang et al.

(10) Patent No.: US 11,333,586 B2
(45) Date of Patent: May 17, 2022

(54) SMEAR STAINING MACHINE

(71) Applicant: SHENZHEN MINDRAY BIO-MEDICAL ELECTRONICS CO., LTD., Shenzhen (CN)

(72) Inventors: Bin Jiang, Shenzhen (CN); Tao Shen, Shenzhen (CN); Shubin Xue, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 131 days.

(21) Appl. No.: 16/808,177

(22) Filed: Mar. 3, 2020

(65) Prior Publication Data

US 2020/0240880 A1 Jul. 30, 2020

Related U.S. Application Data (63) Continuation of application No. 15/963,819, filed on Apr. 26, 2018, now Pat. No. 10,648,892, which is a continuation of application No. 15/271,089, filed on Sep. 20, 2016, now Pat. No. 9,995,660, which is a continuation of application No. PCT/CN2014/073797, filed on Mar. 20, 2014.

(51) Int. Cl.
| | |
|---|---|
| *G01N 1/00* | (2006.01) |
| *G01N 1/28* | (2006.01) |
| *G01N 11/00* | (2006.01) |
| *G01N 11/04* | (2006.01) |
| *G01N 35/00* | (2006.01) |

(52) U.S. Cl.
CPC .......... *G01N 1/2813* (2013.01); *G01N 11/00* (2013.01); *G01N 11/04* (2013.01); *G01N 35/00029* (2013.01); *G01N 2035/00138* (2013.01)

(58) Field of Classification Search
None
See application file for complete search history.

(56) References Cited

U.S. PATENT DOCUMENTS

| | | | |
|---|---|---|---|
| 5,650,332 | A | 7/1997 | Gao et al. |
| 6,083,759 | A | 7/2000 | Tashima |
| 7,300,804 | B2 | 11/2007 | Selleck-Prince |
| 2006/0065044 | A1 | 3/2006 | Tsang |
| 2006/0105462 | A1 | 5/2006 | Selleck-Prince |
| 2013/0021461 | A1 | 1/2013 | Zahniser et al. |
| 2013/0167770 | A1 | 7/2013 | Shoffner |

FOREIGN PATENT DOCUMENTS

| | | | |
|---|---|---|---|
| CN | 1817375 | A | 8/2006 |
| CN | 2814396 | Y | 9/2006 |
| CN | 2855326 | Y | 1/2007 |
| CN | 1920526 | A | 2/2007 |
| CN | 101694431 | A | 4/2010 |
| CN | 102042924 | A | 5/2011 |

(Continued)

*Primary Examiner* — Jyoti Nagpaul
(74) *Attorney, Agent, or Firm* — Kory D. Christensen (57) ABSTRACT

A smear staining machine and a smearing control method and device thereof. The viscosity of the test sample is used for guiding the configuration of at least on smearing parameter. Since the viscosity of the test sample presents multiple influences of many effecting parameters, it is more suitable for presenting the characteristics of the test sample. Therefore, better smearing effect could be acquired by referring the viscosity of the test sample to get the smearing parameter.

12 Claims, 4 Drawing Sheets

(56) References Cited

FOREIGN PATENT DOCUMENTS

| | | | |
|---|---|---|---|
| CN | 103175722 | A | 6/2013 |
| CN | 103364236 | A | 10/2013 |
| CN | 103364242 | A | 10/2013 |
| JP | H09170973 | A | 6/1997 |
| JP | 2008161492 | A | 7/2008 |

SMEAR STAINING MACHINE

RELATED APPLICATIONS

This application is a continuation of U.S. patent application Ser. No. 15/963,819, filed on Apr. 26, 2018, which is a continuation of U.S. patent application Ser. No. 15/271,089, filed on Sep. 20, 2016, which is a continuation of PCT Application No. PCT/CN2014/073797, filed on Mar. 20, 2014, all of which are fully incorporated herein by reference.

TECHNICAL FIELD

The present disclosure relates to medical equipment, especially relating to a smear staining machine and a smear control method thereof.

BACKGROUND

The main function of a smear staining machine is for making a blood smear and staining the blood smear if a microscopic examination is needed when abnormal events are found after a routine examination. In the process of making a test sample into a blood smear proper for the microscopic examination, a blood film should be processed for forming a proper appearance with suitable thickness according to characteristics of the sample to configure smearing parameters such as blood drop, smearing speed or smearing angle.

At present, conventional smear technology adjusts smearing parameters mainly based on HCT value of the sample. The HCT value is defined as percentage of red blood cells in certain volume of whole blood, also named as "Hematocrit". Hematocrit reflects characteristics of the sampling blood in certain perspective, it may look convenient but some disadvantages appear as well at the same time, which are described below. Firstly, characteristics of the sampling blood are not decided by the HCT value only, when HCT value is getting lower, the influence weight of the HCT value from characteristics of the sampling blood is more and more limited correspondingly.

On the other hand, blood plasma and internal suspended matters gradually become main influence factors for characteristics of the sampling blood. All kinds of environment factors, such as environment temperature and humidity, storage period and preservation condition, would influence the configuration of the blood film. For instance, by applying the same blood sample at the same smearing parameters, the blood film would get shorter and thick when the environment temperature is getting lower. On the contrary, the blood film would get longer and thin when the environment temperature is getting higher. In addition, the smear staining machine is designed to process abnormal samples and abnormal samples usually come with high percentage of low HCT value. Therefore, under above conditions, the guiding function of the HCT value for the smear parameters would be reduced accordingly. Improper smear parameters may be acquired if smear parameters are adjusted in accordance with HCT value so as to influence the effect of the blood film process.

SUMMARY

Therefore, a smear staining machine and a smearing control method and device are provided.

A smear control method for controlling a smear staining machine comprises determining at least one smearing parameter according to a viscosity of a test sample, and controlling a smear action according to the smearing parameter. Wherein determining at least one smearing parameter according to a viscosity of a test sample comprises: measuring a viscosity characteristic of the test sample when the test sample flows through a pipeline under a preset condition, wherein the viscosity characteristic is a physical quantity influenced by the viscosity of the test sample when the test sample flows, and the physical quantity is a function of viscosity; processing the viscosity characteristic of the test sample to generate a processing result; and determining the smearing parameter according to the processing result.

The viscosity of the test sample is used for guiding the configuration of at least on smearing parameter. Since the viscosity of the test sample presents multiple influences of many effecting parameters, it is more suitable for presenting the characteristics of the test sample. Therefore, better smearing effect could be acquired by referring the viscosity of the test sample to get the smearing parameter.

BRIEF DESCRIPTION OF THE DRAWINGS

For explaining embodiments of the present application or conventional technology more clearly, figures used for explaining embodiments or conventional background are shortly introduced below. Obviously, in the drawings, similar drawings contain similar symbols for the same device or part, or for a part which has an analogous function and/or analogous structure. It should be understood that these drawings describe different kinds of embodiments, but are not to be considered as limitations of the scope.

DETAILED DESCRIPTION

Specific details for fully understanding each of embodiments and implemented by the skilled in the art are provided in bellow description. However, it should be understood for those skilled in the art that the present invention is able to be implemented without the specific details as well. In some embodiments, conventional structures and functions are omitted to avoid confusions in the descriptions of the embodiments.

Unless it is acquired clearly under context of the descriptions, the terms "comprise", "include" should be defined as opening definition but not limited or exhaustive definition.

Figure 1:
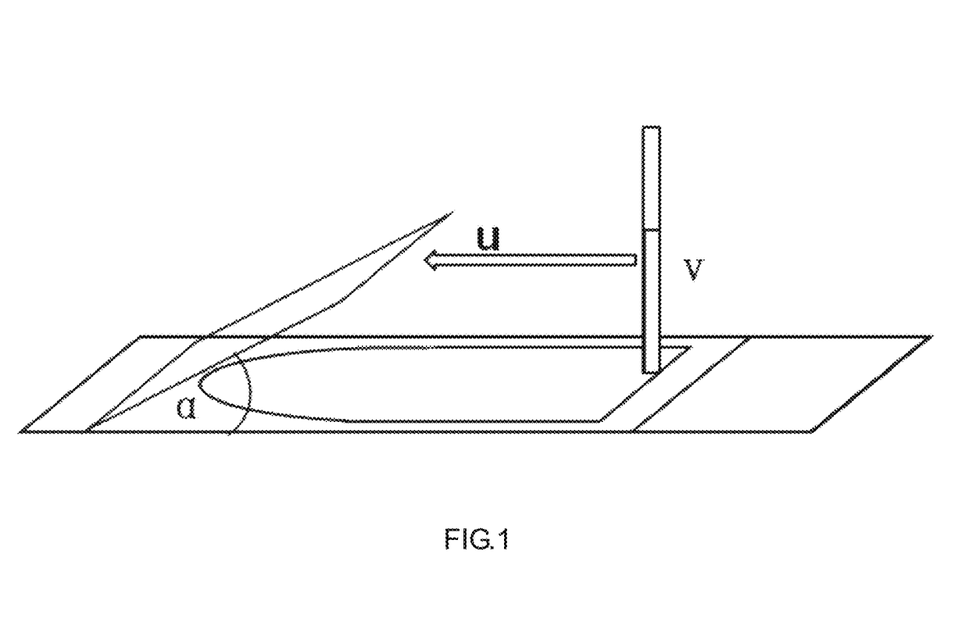
FIG. 1 is a schematic of a smearing process.

If a blood drop needs to be processed to form a blood smear whose appearance size (area of the blood film, width, length and appearance) and cells distribution under microscopic scale both satisfied with clinical trial, three main smearing parameters, volume of the blood drop (blood drop amount), smearing speed and smearing angle, must be selected reasonably. As illustrated in FIG. 1, thickness of the blood film is thicker and the blood film is with longer length (if with fixed width) when the drop blood amount V is with more amount. The thickness of the blood film is thicker and the blood film is with shorter length when the smearing speed U is increased. The thickness of the blood film is thicker and the blood film is with shorter length when the smearing angle is increased.

In this application, when a smear staining machine makes blood smears, the smearing parameters are configured according to viscosity of the blood sample. Except the HCT value, the factors influencing the viscosity of blood sample includes size and form of the red blood cells, deformability of the red blood cells, aggregation of the red blood cells, amount of the white blood cells and platelets, blood plasma and polymer suspended matters inside it (all kinds of proteins, lipids, carbohydrates), sample temperature and storage period. In conclusion, the viscosity of blood sample could be defined as comprehensive effects of multiple factor. Therefore, the viscosity of blood sample is more suitable for representing characteristics of the sampling blood.

The apparent viscosity of fluid could generally reflect the viscosity of fluid. Therefore, in one embodiment, the apparent viscosity of the blood sample could be examined under conventional technologies. The apparent viscosity of the blood sample is applied to guide the configuration of the smearing parameters then the smearing process are controlled according to the smearing parameters. However, examination of the apparent viscosity of the blood sample is complex, and usually can only be implemented by adding additional examination equipments. In addition, the operation period for waiting the examining result of the apparent viscosity of the blood sample would be quit long correspondingly, so that the viscosity of the blood sample could easily be influenced by the factors of temperature and aging sample. It means the temperature in examining the apparent viscosity of the blood sample may not be the same with the temperature in sample smearing. So, the apparent viscosity of the blood sample may not be the same with the apparent viscosity in sample smearing as well.

In one embodiment of this application, relative viscosity or viscosity ratio of the tested samples are applied to guide the configuration of the smearing parameters. Relative viscosity of the tested sample is defined as viscosity of the tested sample referring to a preset viscosity of a reference fluid under a smearing temperature. In this application, the temperature at the time point the relative viscosity of the tested sample calculated is defined as the smearing temperature. The viscosity ratio is the viscosity ratio between the tested sample and the reference fluid. If a user wants to calculate the relative viscosity or the viscosity ratio of the tested samples, at least one reference fluid should be selected at first. After that, the relative viscosity or the viscosity ratio of the tested samples could be calculated by the examination of configuring the tested samples and the reference fluid under the same conditions.

Below descriptions discloses a method for guiding the configuration of the smearing parameters by applying the relative viscosity or viscosity ratio of the tested samples.

Figure 2:
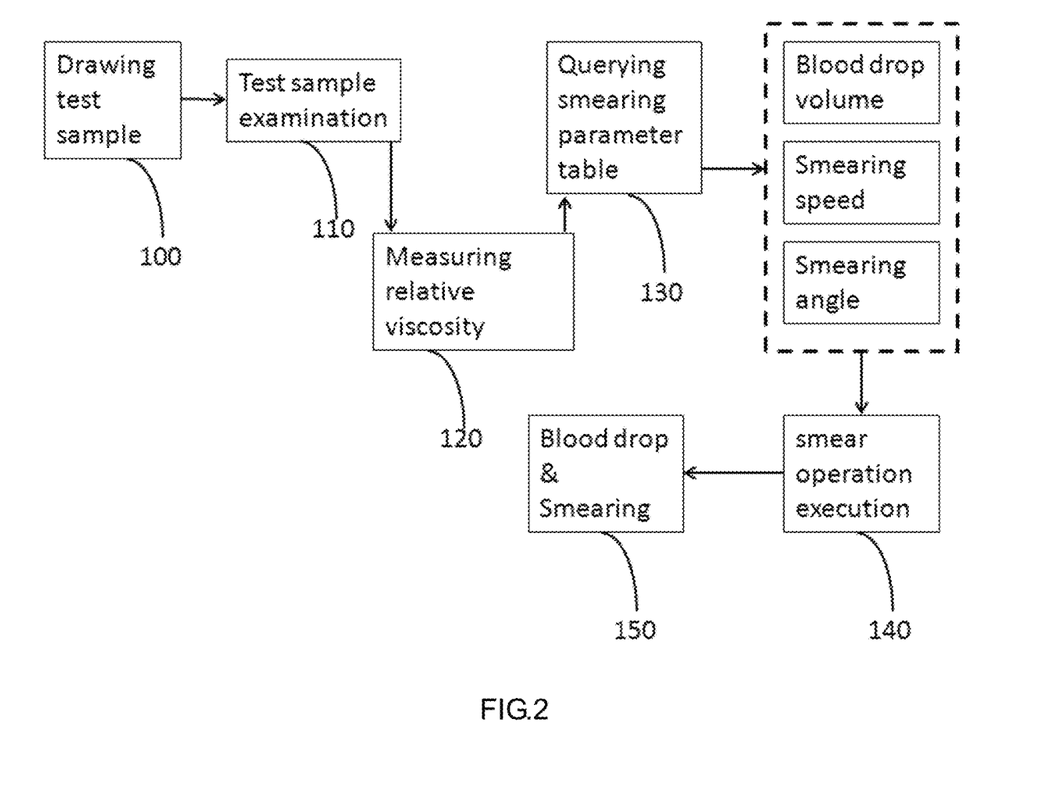
FIG. 2 is a flowchart of the smearing process in one embodiment of the present application.

After the reference fluid is determined, apparent viscosities of the reference fluid in various temperatures could be acquired at first. When the smearing process is needed, the flow chart of the smearing process is shown as FIG. 2, including steps below:

Step 100, drawing the test sample. Step 110, examining the test sample under the same conditions comparing with the reference fluid. The examination of the reference fluid should be preferably conducted before the examination of the test sample, which means the examination of the reference fluid should be conducted before Step 100.

Step 120, comparing a test result of the test sample with a test result of the reference fluid so as to acquire the viscosity ratio of the test sample relating the reference fluid. After that, based on the apparent viscosity of the reference fluid under the test temperature, calculating the relative viscosity of the test sample. The viscosities of the reference fluid in various temperatures could be acquired by pre-testing or pre-querying.

Step 130, determining the smearing parameters according to the relative viscosity of the test sample. The smearing parameters mainly include blood drop amount, smearing speed and smearing angle. The smearing parameters could be acquired by the way of querying table, relation curves or calculation equations. According to experiments, larger the relative viscosity of the test sample is, more difficult to process the blood film is accordingly. It requires lower smearing speed and smaller smearing angle. Under this principle, such as throughout experiments for massive samples, a corresponding table between the relative viscosity and the smearing parameters is acquired. If the relative viscosity of the tested sample examined right now is determined, the smearing parameters suitable for this tested sample could be acquired by checking the corresponding table.

Step 140, controlling a smearing mechanism according to the smearing parameters.

Step 150, dropping the test sample on a slide and extending the test sample as a film by the smearing mechanism according to the smearing parameters.

Since the reference fluid is determined, the relative viscosities of it under various temperatures could be pre-acquired as well. Since temperature influences have already been considered in the examination process for the calculation of the apparent viscosity of the reference fluid, the relative viscosity of the test sample referring to the viscosity ratio between the reference fluid and the test sample has considered and avoided the temperature influences as well. In addition, the relative viscosity of the test sample only been examined when a smearing process is required, the time gap between the examination for the relative viscosity and the smearing process would be small enough accordingly so that the relative viscosity in examination could more precisely close to the relative viscosity of the test sample when it is smeared. Above embodiment eliminates influences of multiple factors such as environment temperature and sample storage period.

Figure 3:
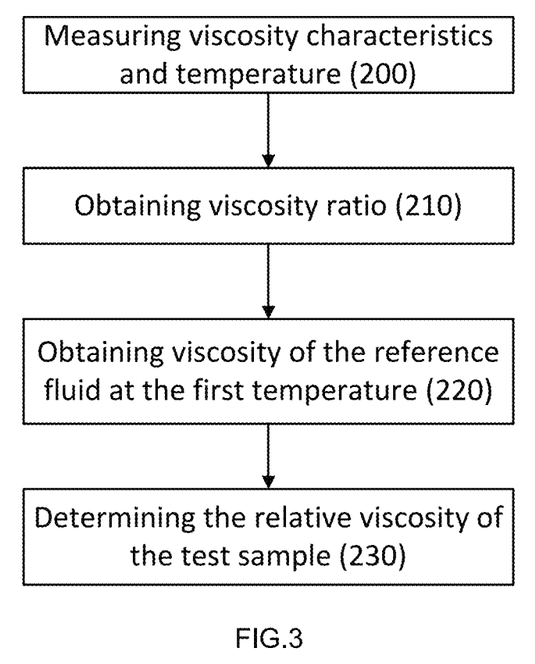
FIG. 3 is a measuring flowchart of the relative viscosity of a test sample in one embodiment of the present application.

For measuring the relative viscosity of the test sample, a factor named "viscosity characteristic" is defined in the embodiments of this application. The viscosity characteristic is defined as a physical quantity influenced by the viscosity of materials when the materials flow in a medium. The physical quantity could be represented as a functional equation of viscosity. The flow chart for calculating the relative viscosity of the test sample is shown in FIG. 3, including below steps:

Step 200, examining the temperature and the viscosity characteristic. In step 200, the viscosity characteristic of the reference fluid and the test sample are respectively examined when the reference fluid and the test sample flow through a pipeline under the same condition. A first temperature defined as the temperature of the examination for the reference fluid is examined at Step 200 at the same time. When the viscosity characteristic of the reference fluid is calculated, the reference fluid should flow through the pipeline under a preset configuration. When the viscosity characteristic of the test sample is calculated, the test sample should flow through the pipeline under the preset configuration the same as conducting the viscosity characteristic of the reference fluid. The preset configuration could include configured flow rate, velocity or volume. The pipeline for calculating the viscosity characteristic of the test sample or the reference fluid could be an identical pipeline or different physical pipelines with the same geometric size preferably.

Step 210, comparing the viscosity characteristic of the reference fluid with the viscosity characteristic of the test sample to acquiring the functional equation containing the viscosity ratio between the reference fluid and the test sample.

Step 220, acquiring the apparent viscosity of the reference fluid under the first temperature.

Step 230, calculating the viscosity of the test sample according to the functional equation of the viscosity ratio and the apparent viscosity of the reference fluid, and defining above viscosity as the relative viscosity of the test sample.

A detail description of an example for defining the viscosity characteristic as pressure difference is disclosed below:

Embodiment 1

The smear staining machine includes a sampling mechanism, a smearing mechanism and a processor. The sampling mechanism is implemented for drawing or discharging fluids. The smearing mechanism is implemented for dropping a test sample on a slide and extending the test sample as a film according to the smearing parameters. The processor respectively connects to the sampling mechanism and the smearing mechanism for controlling the operations of the sampling mechanism and the smearing mechanism individually. In this application, the processor also acquires the smearing parameters according to the viscosity of the test sample, and controls the smear operation of the smearing mechanism according to the smearing parameters.

The viscosity of the test sample could be inputted into the smear staining machine by the user after the viscosity of the test sample is acquired outside the smear staining machine. For example, an examining method could be applied for acquiring the apparent viscosity of the test sample at first. Then the apparent viscosity of the test sample is inputted into the smear staining machine. The processor responses above inputted information and selects the smearing parameters according to the inputted apparent viscosity.

In one embodiment, when smear is required, a mechanism of the smearing mechanism itself is implemented for measuring the viscosity of the test sample. The sampling mechanism includes a sample pipeline, an injector and a detector. The detector is configured on the sample pipeline for measuring the viscosity characteristic of the test sample when the test sample flows through the sample pipeline under the preset configuration. The processor measures the viscosity characteristic outputted from the detector and processes the viscosity characteristic to product a processing result. The processor further determines the smearing parameters in accordance with the processing result.

Figure 4:
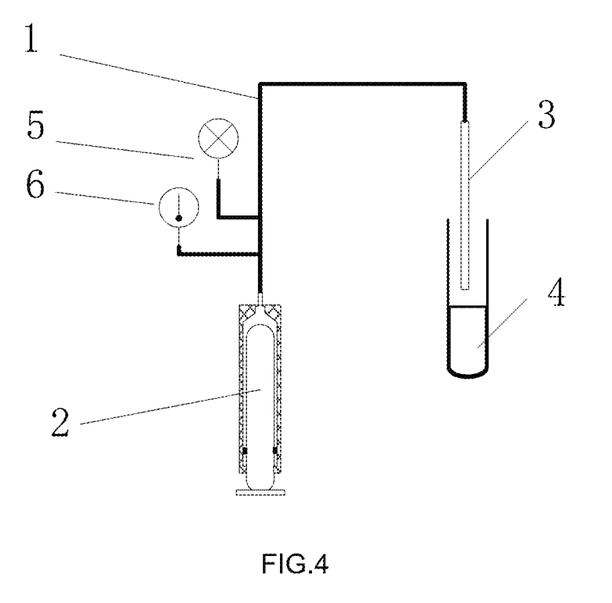
FIG. 4 is a structure schematic of one device embodiment of the present application.

FIG. 4 illustrates a structure diagram of the sampling mechanism. In this embodiment, a pressure sensor is implemented as a detector for measuring the viscosity characteristic. Under this configuration, the viscosity characteristic is represented as pressure data. The sampling mechanism includes a sample pipeline 1, an injector 2, a sample pin 3, a pressure sensor 5 and a temperature sensor 6 and a processor. An outlet of the injector 2 is coupled with a first terminal of the sample pipeline 1. A second terminal of the sample pipeline 1 is coupled with the sample pin 3. The sample pin 3 is implemented for drawing a sample from a test tube 4. The pressure sensor 5 and the temperature sensor 6 are configured on the sample pipeline 1 respectively. For instance, both of above two sensors are able to be configured nearby the first terminal or a middle portion of the pipeline 1. Above two sensors are implemented for measuring the pressure state and the temperature state in the pipeline 1 respectively. The processor electrically couples to the injector 2 for controlling the injector 2 to drive a drawing operation or a discharging operation of the pipeline 1.

Moreover, the processor calculates the viscosity ratio between the reference fluid and the test sample according to the pressure data and the temperature data measured by the pressure sensor 5 and the temperature sensor 6, and further calculates the relative viscosity of the test sample correspondingly. The smearing parameters are acquired thereafter according to the viscosity of the test sample. The smearing machine is controlled for smearing under acquired smearing parameters. In a detail embodiment, liquid material is generally selected as the reference fluid. For ensuring the accuracy of sampling process, the sample pipeline and the injector are demanded to preserve some liquid inside under normal circumstance. In the mean time, the liquid inside the injector and the pipeline is required to select from isosmotic solution for avoiding transformation happens when the red blood cells engage with the liquid material. Under this situation, for the convenience of calculation, the reference fluid includes reference liquid and reference gas. In one of below embodiment, isosmotic solution is selected as the reference liquid. The detail test process is disclosed below:

1. Calibration process 1: the injector 2 controls the sample pipeline 1 to draw airs with the same volume comparing with the sample drew in above sample drawing process at the same speed of above sample drawing process. The pressure sensor 5 and the temperature sensor 6 respectively measure the pressure data and the temperature data in the sample pipeline 1 when the injector 2 draws airs. The pressure data and the temperature data are recorded in above process. In this embodiment, the pressure data outputted from the pressure sensor 5 is relative pressure data. Precisely, the pressure data outputted from the pressure sensor 5 is the pressure difference relative to atmospheric pressure of environment.

2. Calibration process 2: the injector 2 controls the sample pipeline 1 to draw isosmotic solution with the same volume comparing with the sample drew in above sample drawing process with the same speed of above sample drawing process. The pressure data and the temperature data are recorded in above process.

3. Calculation process: the injector 2 controls the sample pipeline 1 to draw the sample. The pressure data and the temperature data are recorded in above process as well.

Figure 5:
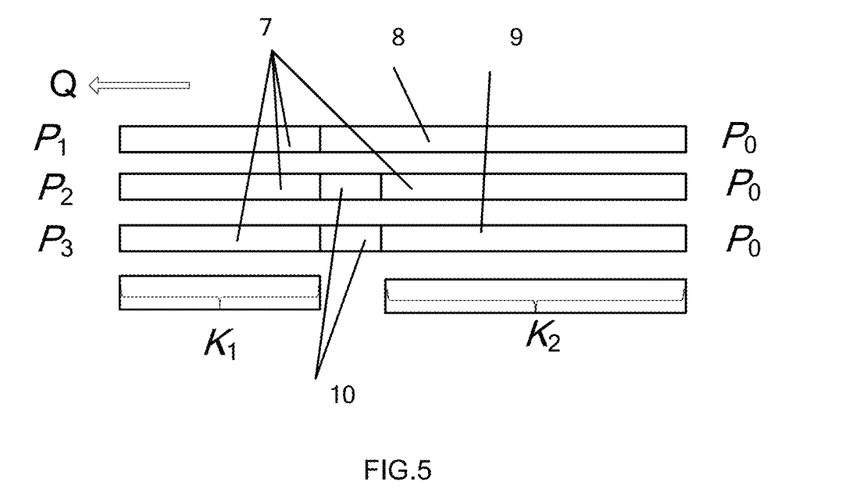
FIG. 5 is a schematic illustrating states in a pipeline during the relative viscosity measuring process in one embodiment of the present application.

4. Acquiring three pipeline pressure data during above three processes all at the same specific time point, wherein the gas pressure difference is marked as $\Delta P1$, the liquid pressure difference is marked as $\Delta P2$ and the pressure difference in sample acquiring process is marked as $\Delta P3$. In other embodiments, if outputs of the pressure sensor are absolute pressure values, the pressure difference between the absolute pressure value in the air drawing process (calibration process 1) and the environment atmospheric pressure $P0$ is defined as $\Delta P1$. Under the same rule, the pressure difference between the absolute pressure value in the liquid drawing process (calibration process 2) and the environment atmospheric pressure $P0$ is defined as $\Delta P2$, and the difference between absolute pressure of sampling process and the environment atmospheric pressure P0 is defined as ΔP3. The state of the pipeline at the specific time point is shown in FIG. 5. In FIG. 5, 7 represents the isosmotic solution in the pipeline, 8 is the air sample in the pipeline, 9 is the sample in the pipeline and 10 is an isolated air gap.

If the time points between the calculation process and the examination process are close to each other enough, the temperature values of the calculation process and the examination process could be defined as the identical. Under above condition, the relation equations of ΔP1, ΔP2 and ΔP3 could be defined from below equation (1) to equation (3):

$$\Delta P_1 = \eta_D \cdot Q \cdot K_1 \quad (1)$$

$$\Delta P_2 = \eta_D \cdot Q \cdot \kappa_1 + \eta_D \cdot Q \cdot \kappa_2 \quad (2)$$

$$\Delta P_3 = \eta_D \cdot Q \cdot K_1 \cdot Q \cdot K_2 \quad (3)$$

Where, $\eta_B$ is the relative viscosity of the test sample, $\eta_D$ is the relative viscosity of the reference liquid at the first temperature. Q is the flow rate of the liquid flowing in the pipeline, K1 is the damping value of the front portion of the pipeline, K2 is the damping value of the backend portion of the pipeline, the main influence factors of the damping value are only relating with the pipeline features, such as pipeline length and pipeline radius and etc. APi is the pressure difference of the reference gas, ΔP2 is the pressure difference of the reference liquid and ΔP3 is the pressure difference of the test sample.

For equation (1) into equation (2), and comparing equation (2) with equation (3), equation (4) is acquired as below:

$$\eta_B = \frac{\Delta P_3 - \Delta P_1}{\Delta P_2 - \Delta P_1} \cdot \eta_D \quad (4)$$

By acquiring $\eta_D$ the relative viscosity of the test sample $\eta_B$ could be calculated according to equation (4).

Above embodiments of this application, by comparing with a known viscosity of the reference fluid with an unknown viscosity of the test sample, the relative viscosity of the test sample relating to the known viscosity of the reference fluid in the real time temperature is calculated. For implementing above solution, there is no additional detection equipment required in hardware approaches, but only a temperature sensor and a pressure sensor are added in the original smear machine. By using the data detected from the pressure sensor and the temperature sensor, the relative viscosity of the test sample could be calculated. In addition, when the smear machine stays at constant temperature environment, there is no need to add the temperature sensor with the sampling mechanism but to get the environment temperature of the smear machine from an additionally provided thermometer. The apparent viscosity of the reference liquid is acquired according to the environment temperature. In this embodiment, the time point of viscosity measuring for the test sample is close to the time point of smear. Moreover, both of above measuring are implemented at similar position in the smear machine so that the temperatures of both are even closer or just identical to each other. Under this circumstance, the measured viscosity of the test sample could represent the true viscosity of the test sample more identically.

Embodiment 2: in a real practice, execution of above calibration processes may not be expected by the user in every smearing process. Therefore, measuring for the reference liquid could be conducted at first to execute the calibration process, and the measuring result of above is saved correspondingly. In the situation that the temperature of the isosmotic solution during the calibration process is different from the temperature of the isosmotic solution during the calculation process, responding process for that is described below:

The processes for measuring pressure and temperature are the same with the embodiment 1. Equation (1), equation (2) and equation (3) should be amended to equation (5), equation (6) and equation (7) accordingly as shown below:

$$\Delta P_{1\_T1} = \eta_{\circ\_T1} \cdot Q \cdot K_1 \quad (5)$$

$$\Delta P_{2\_T1} = \eta_{D\_T1} \cdot Q \cdot K_1 + \eta_{D\_T1} \cdot Q \cdot K_2 \quad (6)$$

$$\Delta P_{1\_T1} \frac{\eta_{D\_T2}}{\eta_{D\_T1}} = \eta_{D\_T2} \cdot Q \cdot K_1 \quad (7)$$

In equation (5), (6), (7), T1 is defined as the temperature of isosmotic solution during the calibration process. T2 is defined as the temperature during the measuring of the test sample. ΔP1_T1 is defined as the pressure difference of the pipeline and the environment pressure in the air drawing process during calibration (when temperature is defined as T1). ΔP2_T1 is defined as the pressure difference of the pipeline and the environment pressure when drawing isosmotic solution during calibration (when temperature is defined as T1). ΔP3_T2 is defined as the pressure difference of the pipeline and the environment pressure during calibration (when temperature is defined as T2).

Equation (5) and equation (6) should be calibrated in accordance with the temperature data from step 1 and step 2. The result of above calibration is shown in equation (8) and equation (9):

$$\Delta P_{1\_T1} \frac{\eta_{D\_T2}}{\eta_{D\_T1}} = \eta_{D\_T2} \cdot \rho \cdot K_1 \quad (8)$$

$$\Delta P_{2\_T1} \frac{\eta_{D\_T2}}{\eta_{D\_T1}} = \eta_{D\_T2} \cdot Q \cdot K_1 \cdot \eta_{D\_T2} \cdot \rho \cdot K_2 \quad (9)$$

For equation (8) into equation (9), and comparing equation (9) with equation (7), and get equation (10) as below:

$$\eta_B = \frac{\eta_{D\_T1} \Delta P_3 - \eta_{D\_T2} \Delta P_1}{\Delta P_2 - \Delta P_1} \quad (10)$$

For the situation that the drawing pipeline and the time period of the examination process are both longer, the temperatures of isosmotic solution in different portions of the pipeline could be different. By implemented the solution of this embodiment, the relative viscosity of the test sample calculated could more precisely represent the true viscosity of the test sample in the present temperature.

By implementing this embodiment, since the characteristics of the reference liquid is confirmed, the calibration process could be conducted previously. Therefore, the pressure data of the reference liquid is measured and saved before the viscosity measuring. When the smearing process is acquired, the drawing process is conducted correspondingly. By using the pressure data measured during the sample drawing process and the pressure data of the reference liquid measured before cooperatively, the viscosity of the test sample in the present temperature could be calculated without further additional viscosity calculation process.

In accordance with the disclosed content and physical invention of this embodiment, the reference liquid mentioned could be a different liquid comparing with the pre-stored liquid. By implementing the measuring method and inventive idea, the relative viscosity of the test sample could be calculated.

Embodiment 3: In this embodiment, the calibration process and the calculation process are conducted in the mean time, or are conducted in sequence during a narrow time period. Therefore, the difference of environment temperatures between above two processes is small enough and could be considered as identical. The relative viscosity then could be simplified as below:

$$\frac{\eta_B}{\eta_D} = \frac{\Delta P_3 - \Delta P_1}{\Delta P_2 - \Delta P_1} \tag{11}$$

Thereafter, according to $$\frac{\eta_B}{\eta_D},$$

by using the preset relations between the viscosity ratio and the smearing parameters in different temperatures, the smearing parameters under the present environment temperature is acquired according to the conducted viscosity ratio. The environment temperature is the temperature of where the smearing machine positioned, which could be measured by the temperature sensor on the smearing machine or by another individual thermometer Accordingly, the smearing machine in this embodiment includes a parameter determination module and a control module. The parameter determination module is implemented for confirming the smearing parameters according to the viscosity of the test sample. The control module is implemented for controlling the smearing machine to smear according to the smearing parameters. The parameter determination module includes a viscosity calculation unit and a parameter determination unit. The viscosity calculation unit is implemented for calculating the relative viscosity of the test sample. The relative viscosity of the test sample is defined as the apparent viscosity of the test sample relating to a known viscosity of the reference liquid at the smearing temperature.

Figure 6:
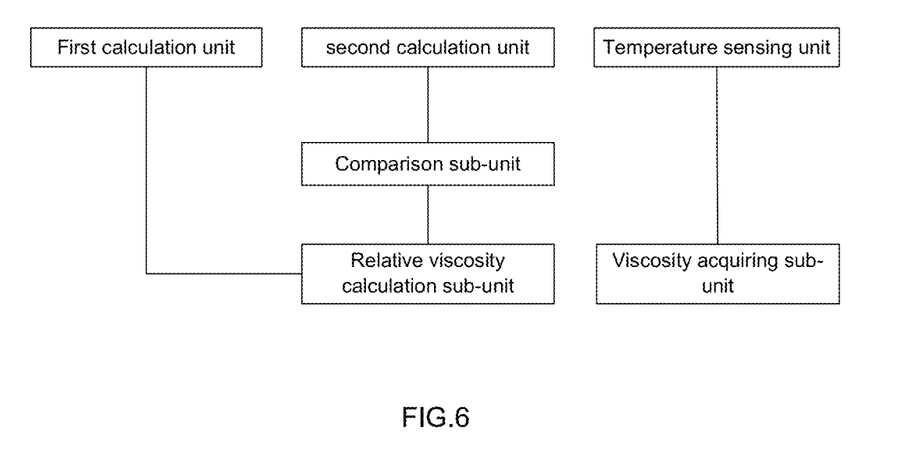
FIG. 6 is a structure schematic of a viscosity measuring unit in one embodiment of the present application.

As shown in FIG. 6, the viscosity calculation unit includes a first calculation sub-unit 11, a temperature sub-unit 12, a second calculation sub-unit 13, a comparison sub-unit 14, a viscosity acquirement sub-unit 15 and a relative viscosity calculation sub-unit 16. The first calculation sub-unit 11 is implemented for calculating a viscosity characteristic of the reference liquid when the reference liquid flows through the pipeline under a preset condition. The viscosity characteristic is defined as a physical quantity influenced by the viscosity of the reference liquid when the liquid flows. The physical quantity could be represented as a function formula of the viscosity.

The temperature sub-unit 12 is implemented for measuring temperatures of the pipeline from the temperature sensor, which includes a first temperature during the measurement of the reference liquid and/or a second temperature during the measurement of the test sample. The second calculation sub-unit 13 is implemented for calculating the viscosity characteristic of the test sample when the test sample flows through the pipeline under a preset condition. The comparison sub-unit 14 is implemented for comparing the viscosity characteristic of the test sample with the viscosity characteristic of the reference liquid to acquire a relation with the ratio viscosity between the reference liquid and the test sample. The viscosity acquirement sub-unit 15 is implemented for acquiring the apparent viscosity of the reference liquid at the first temperature. The relative viscosity calculation sub-unit 16 is implemented for calculating the viscosity of the test sample according to the ratio viscosity relation and the viscosity of the reference liquid, and defining the acquired viscosity as the relative viscosity of the test sample.

At the condition that the viscosity characteristic is defined as pressure data, the first calculation sub-unit 11 is implemented for measuring pressure difference of the pipeline measured by the pressure sensor when the reference liquid flows through the pipeline under the preset flow rate. The second calculation sub-unit 13 is implemented for measuring the pressure difference of the pipeline measured by the pressure sensor when the reference test sample flows through the pipeline under the preset flow rate. On another word, the second calculation sub-unit 13 controls the sampling pipeline to draw the reference fluid and the test sample with a same volume such that the reference fluid and the test sample flow through the pipeline in a same amount.

If there is pre-stored liquid left in the pipeline and the reference fluid include reference gas and reference liquid, the pressure data, the pressure data should include the pressure difference of the pipeline measured by the pressure sensor when the reference gas flows through the pipeline under the preset flow rate and the pressure difference of the pipeline is measured by the pressure sensor when the reference liquid flows through the pipeline under the preset flow rate.

When the temperature difference between calibration process and the calculation process is ignored, the relative viscosity of the test sample is calculation through below equation:

$$\eta_B = \frac{AP_3 - AP_1}{AP_2 - AP_1} \cdot \eta_D$$

Wherein, $\eta_B$ is the relative viscosity of the test sample, $\eta_D$ is the viscosity of the reference liquid under the first temperature, $Ap_1$ is the pressure difference of the reference gas, $\Delta P_2$ is the pressure difference of the reference liquid, $\Delta P_3$ is the pressure difference of the test sample.

If the temperature difference between calibration process and the calculation process is considered, the relative viscosity of the test sample is calculation through below equation:

$$\eta_B = \frac{\eta_{D\_T1} AP_3 - \eta_{D\_T2} AP_1}{AP_2 - AP_1}.$$

Wherein, $\eta_B$ is the relative viscosity of the test sample, $\eta_{D\_T1}$ is the apparent viscosity of the reference liquid under the first temperature, $\eta_{t2}$ is the apparent viscosity of the reference liquid under the second temperature, is the pressure difference of the reference gas, ΔP2 is the pressure difference of the reference liquid, ΔP3 is the pressure difference of the test sample.

When the smearing machine is positioned at a constant temperature environment, there could be no temperature sensor on the sampling mechanism. The environment temperature of where the smearing machine positioned could be provided from an additional thermometer and the apparent viscosity of the reference liquid is acquired under the environment temperature.

In accordance with the public content of this application, skilled in the art should understand that the viscosity calculation unit could further calculate the viscosity ratio between the test sample and the reference liquid according to the feature quantities of the test sample and the reference liquid when the test sample and the reference liquid flows through the pipeline under the same configuration. The parameter determination unit confirms the smearing parameters according to the viscosity ratio. In this circumstance, the environment temperature of the smearing machine is generally required, and the smearing parameters are acquired through table check, relation curve check or equation calculation according to the viscosity ratio and the environment temperature.

The pressure data for instance in this application is the pressure data be acquired from a test tube in a sampling process. Otherwise, pressure data under other flowing states which representing the data when a blood sample flows through the pipeline are also acceptable. Those data above includes but do not limit to the data pressure under a transportation process, a dividing process or a discharging process.

In the embodiments in this application, the injector is implemented for sample drawing under a fixed flow rate. However, other devices are also acceptable for getting fixed floe rate, such as a rotary piston pump or a peristaltic pump. A flow rate varied under a particular regularity could be used, such as linearly increasing the flow rate from 0 to 300 uL/s.

In accordance with the publishing content and inventive idea of the present application, it should be understood by the skilled in the art that the viscosity characteristic in this application could be replaced by other physical quantities, such as velocity. For example, one or more light sensors could be added to configure in one or some specific positions in the sampling pipeline so that a time period defined as a period that the blood sample flowing through above two or more light sensors in the sampling process could be measured. Specifically, as shown in FIG. 5, a time point when the k2 section of the blood sample or the head portion of diluents trigger an opto-couple reaction could be measured for velocity measurement. Or, a time point when the tail portion triggers an opto-couple reaction could be measured for velocity measurement as well. Since deformation could happens on the pipeline under over-pressure and the pressure difference generated on the sampling process would become larger when the viscosity increases, the deformation of the pipeline would be increased correspondingly when the viscosity increases to over-pressure so as to make a blood sample with more viscosity has to take more time to reach one of the light sensor from the beginning of the sampling process. Or, the blood sample with more viscosity has to take more time to flow through one light sensor from another in the sampling process. Above effect could be used to calculate the viscosity of the blood sample. Precisely, the relation between the viscosity and the time difference could be calculated at first, then back calculates the viscosity according to above relation in real practice.

An example in this application is made for the blood sample. However, other liquid samples are also suitable for processed by the smearing method and machine disclosed in this application, such as serum samples or body fluid samples.

In this application, air and isosmotic solution are selected to be drew in calibration process. But air could be replaced by other gas since some examinations have to be conducted under an anaerobic environment. Isosmotic solution also could be replaced by other reagents for processing other functions in the smearing machine. For example, deionized water, rhenate buffer, alcohol and dye liquid are all needed for the smearing machine in the dying process.

Three advantages for this application are listed below:
1. Simple structure: original sampling mechanism of the smearing machine is reserved. Only an additional pressure sensor and an additional temperature sensor are required.
2. No additional operation of viscosity calculation is required, the pressure data acquired in sampling process by the sampling mechanism could be implemented directly.
3. No additional calibrating materials or control materials are required. The viscosity of the isosmotic solution is configured as standard base for the smearing machine.

It is understandable for the skilled in the art that all or some of the processes disclosed in the embodiments of the present application are able to be implemented by instructing relating hardware through computer programs. Above programs are able to be stored in a readable storing media of computer. Above programs are able to include the implement of all flow charts for all methods disclosed in above embodiments in execution. The readable storing media include but not limited to select from below: Hard Disc, Optical Disc, Read-Only Memory (ROM) and Random Access Memory (RAM).

Although the present disclosure has been described through specific embodiments, the present disclosure is not limited to the specific embodiments described above. Those of skill in the art should understand that various modifications, alternatives and variations may be made based on the present disclosure, which all should be within the scope of protection of the present disclosure. Furthermore, "a (an) embodiment" or "another embodiment" mentioned above may represent different embodiments, or may also be combined completely or partly in one embodiment.

The invention claimed is:

1. A smear control method for controlling a smear staining machine, comprising:
   drawing a test sample;
   flowing the test sample through a pipeline;
   measuring a viscosity characteristic of the test sample when the test sample flows through the pipeline, wherein the viscosity characteristic is a pressure data of the test sample when the test sample flows through the pipeline;
   determining a smearing parameter according to the viscosity characteristic; and
   controlling a smear action of the smear staining machine according to the smearing parameter.

2. The smear control method of claim 1, wherein the pressure data comprises an absolute pressure or a pressure difference relative to an atmospheric pressure.

3. The smear control method of claim 1, further comprising:
while measuring the viscosity characteristic of the test sample when the test sample flows through the pipeline, measuring a smear temperature in the pipeline where the test sample flows through; and
determining the smearing parameter according to the viscosity characteristic and the smear temperature.

4. The smear control method of claim 1, wherein the step of flowing the test sample through a pipeline comprises: flowing the test sample through the pipeline under a preset condition; and
wherein the step of determining a smearing parameter according to the viscosity characteristic comprises:
measuring a viscosity characteristic of a reference fluid when the reference fluid flows through a pipeline under the same preset condition, wherein the reference fluid has a known apparent viscosity;
comparing the viscosity characteristic of the test sample with the viscosity characteristic of the reference fluid, to generate a comparison result;
calculating a relative viscosity of the test sample according to the comparison result and the known apparent viscosity of the reference fluid, wherein the relative viscosity of the test sample is a viscosity of the test sample relative to the known apparent viscosity of the reference fluid;
determining the smearing parameter according to the relative viscosity of the test sample.

5. The smear control method of claim 4, further comprising:
while measuring the viscosity characteristic of the reference fluid when the reference fluid flows through the pipeline under the same preset condition, measuring a first temperature in the pipeline where the reference fluid flows through, wherein the known apparent viscosity of the reference fluid is an apparent viscosity of the reference fluid at the first temperature.

6. The smear control method of claim 5, wherein the viscosity characteristic of the test sample or the viscosity characteristic of the reference fluid is a pressure difference, and the reference fluid comprises a reference gas and a reference liquid when there is a liquid preserved in the pipeline, and the relative viscosity of the test sample is calculated through the below equation:

$$\eta_B = \frac{\Delta P_3 - \Delta P_1}{\Delta P_2 - \Delta P_1} \cdot \eta_D$$

where $\eta_B$ is the relative viscosity of the test sample, $\eta_D$ is a viscosity of the reference liquid at the first temperature, $\Delta P_1$ is a pressure difference of the reference gas, $\Delta P_2$ is a pressure difference of the reference liquid, and $\Delta P_3$ is a pressure difference of the test sample.

7. The smear control method of claim 5, further comprising:
while measuring the viscosity characteristic of the test sample when the test sample flows through the pipeline under the preset condition, measuring a second temperature in the pipeline where the test sample flows through; and
wherein the viscosity characteristic of the test sample or the viscosity characteristic of the reference fluid is a pressure difference, and the reference fluid comprises a reference gas and a reference liquid when there is a liquid preserved in the pipeline, and the relative viscosity of the test sample is calculated through the below equation:

$$\eta_B = \frac{\eta_{D\_T1}\Delta P_3 - \eta_{D\_T2}\Delta P_1}{\Delta P_2 - \Delta P_1}$$

where $\eta_B$ is the relative viscosity of the test sample, $\eta_{D\_T1}$ is a viscosity of the reference liquid at the first temperature, $\eta_{D\_T2}$ is a viscosity of the reference liquid at the second temperature, $\Delta P_1$ is a pressure difference of the reference gas, $\Delta P_2$ is a pressure difference of the reference liquid, and $\Delta P_3$ is a pressure difference of the test sample.

8. The smear control method of claim 7, wherein the reference liquid is an isosmotic solution for the test sample.

9. The smear control method of claim 1, wherein the step of flowing the test sample through a pipeline comprises: flowing the test sample through the pipeline under a preset condition; and
wherein the step of determining a smearing parameter according to the viscosity characteristic comprises:
measuring a viscosity characteristic of a reference fluid when the reference fluid flows through a pipeline under the same preset condition;
comparing the viscosity characteristic of the test sample with the viscosity characteristic of the reference fluid, to acquire a viscosity ratio between the test sample and the reference fluid;
determining the smearing parameter according to the viscosity ratio.

10. The smear control method of claim 9, further comprising:
while measuring the viscosity characteristic of the test sample when the test sample flows through the pipeline under the preset condition, measuring an ambient temperature; and
determining the smearing parameter according to the viscosity ratio and the ambient temperature.

11. The smear control method of claim 9, wherein the pipeline is a sampling pipeline of the smear staining machine, and where the method further comprises:
controlling the sampling pipeline to draw the reference fluid and the test sample with a same volume such that the reference fluid and the test sample flow through the pipeline in a same amount.

12. A smear control method for controlling a smear staining machine, comprising:
drawing a test sample;
flowing the test sample through a pipeline;
measuring a pressure data of the test sample when the test sample flows through the pipeline;
determining a smearing parameter according to the pressure data; and
controlling a smear action of the smear staining machine according to the smearing parameter.

* * * * *